(12) United States Patent
Burton et al.

(10) Patent No.: US 11,299,280 B2
(45) Date of Patent: Apr. 12, 2022

(54) LEADING-EDGE THERMAL ANTI-ICE SYSTEMS AND METHODS

(71) Applicant: The Boeing Company, Chicago, IL (US)

(72) Inventors: Jeffrey Michael Burton, Seattle, WA (US); Stephen Roger Amorosi, Seattle, WA (US); Douglas James Silva, Auburn, WA (US)

(73) Assignee: The Boeing Company, Chicago, IL (US)

( * ) Notice: Subject to any disclaimer, the term of this patent is extended or adjusted under 35 U.S.C. 154(b) by 295 days.

(21) Appl. No.: 16/521,516

(22) Filed: Jul. 24, 2019

(65) Prior Publication Data

US 2021/0024220 A1 Jan. 28, 2021

(51) Int. Cl.
*B64D 15/04* (2006.01)
*B64C 21/04* (2006.01)

(52) U.S. Cl.
CPC .............. *B64D 15/04* (2013.01); *B64C 21/04* (2013.01)

(58) Field of Classification Search
CPC ............ B64D 15/04; B64D 2033/0233; B64D 2013/0607
USPC ....................................................... 244/134 B
See application file for complete search history.

(56) References Cited

U.S. PATENT DOCUMENTS

| | | | | |
|---|---|---|---|---|
| 1,821,776 | A * | 9/1931 | Vining ................... | B64D 15/04 244/134 B |
| 5,011,098 | A * | 4/1991 | McLaren ............... | B64D 15/04 244/134 B |
| 5,114,100 | A | 5/1992 | Rudolph et al. | |
| 5,807,454 | A * | 9/1998 | Kawabe .................... | B64C 3/28 156/214 |
| 8,413,930 | B2 * | 4/2013 | Gregory ................. | B64D 15/04 244/134 B |
| 8,967,543 | B2 * | 3/2015 | Saito ....................... | F01D 25/02 244/134 B |
| 10,569,888 | B2 * | 2/2020 | Lorenz ................... | B64C 21/02 |
| 10,683,084 | B2 * | 6/2020 | Gueuning ............... | B64C 21/08 |
| 2012/0318922 | A1 * | 12/2012 | Saito ......................... | B64C 3/28 244/134 B |
| 2019/0202566 | A1 * | 7/2019 | Heck ......................... | B64C 3/28 |
| 2019/0359341 | A1 * | 11/2019 | Meis ...................... | B64D 15/20 |

(Continued)

FOREIGN PATENT DOCUMENTS

EP 0376371 A2 7/1990
EP 0376371 A3 7/1990

(Continued)

OTHER PUBLICATIONS

European Patent Office, Extended European Search Report regarding European Patent Application No. 20187521.8-1010, dated Dec. 10, 2020, 7 pages.

*Primary Examiner* — Christopher D Hutchens
(74) *Attorney, Agent, or Firm* — Kolisch Hartwell, P.C.

(57) ABSTRACT

An anti-ice system is disclosed, including an airfoil structure having a leading-edge portion facing a wind direction. The airfoil structure includes an outer skin and an inner skin which form a plurality of channels, each channel having an air inlet and an air outlet. An air delivery duct inside the airfoil structure extends transverse to the wind direction and has a plurality of openings directed toward the air inlets of the channels. A heat exchanger is configured to provide hot air to the air delivery duct.

20 Claims, 6 Drawing Sheets

(56) References Cited

U.S. PATENT DOCUMENTS

| | | | | |
|---|---|---|---|---|
| 2020/0011245 A1* | 1/2020 | Pretty | .................... | B64D 15/04 |
| 2020/0276641 A1* | 9/2020 | Benard | .................... | B22F 3/225 |
| 2020/0346738 A1* | 11/2020 | Erban | .................... | B64D 27/18 |
| 2020/0346765 A1* | 11/2020 | Kutzmann | ............. | B64D 15/04 |

FOREIGN PATENT DOCUMENTS

| | | | |
|---|---|---|---|
| EP | 0436243 | A2 | 7/1991 |
| EP | 0436243 | A3 | 7/1991 |
| EP | 2546147 | A1 | 1/2013 |
| GB | 2447228 | A | 9/2008 |

\* cited by examiner

LEADING-EDGE THERMAL ANTI-ICE SYSTEMS AND METHODS

FIELD

This disclosure relates to systems and methods for prevention of ice accumulation. More specifically, the disclosed examples relate to preventing formation of ice on a leading edge of an aircraft wing.

INTRODUCTION

Aircraft that encounter cold and moist air are susceptible to the formation of ice on various surfaces. Under these conditions, ice accumulation on wings, engine nacelles, turbine elements, or other surfaces can compromise the flight characteristics of the aircraft. Those components most susceptible to icing may therefore be fitted with anti-icing equipment and systems as appropriate for the particular aircraft. A variety of different mechanical, chemical, and thermal systems have been developed and used for preventing or removing ice buildup on aircraft surfaces.

Some thermal anti-icing systems use heated air redirected from the aircraft's engines to areas where icing may occur. When used to prevent icing at the leading edge of aircraft wings, such systems currently occupy a large portion of the space available inside the wing, limiting the amount of space available for other systems in the wing such as actuators for flight control surfaces.

SUMMARY

The present disclosure provides systems, apparatus, and methods relating to a leading-edge anti-ice system. In some examples, an anti-ice system may include an airfoil structure including a leading-edge portion facing a wind direction. The airfoil structure may further include an outer skin and an inner skin forming a plurality of channels, each channel having an air inlet and an air outlet. An air delivery duct inside the airfoil structure may extend transverse to the wind direction and may have a plurality of openings directed toward the air inlets of the channels. A heat exchanger may be configured to provide hot air to the air delivery duct.

In some examples, an aircraft may include a fuselage with a first wing extending from the fuselage and a second wing extending from an opposing side of the fuselage. Each wing may include a leading-edge portion facing a wind direction. Each leading-edge portion may include an outer skin and an inner skin forming a plurality of inner channels, each channel having an internal air inlet and an external air outlet. Each wing may include an air delivery duct extending transverse to the wind direction. The air delivery duct may have a plurality of openings directed toward the air inlets of the channels. A heat exchanger may be configured to provide hot air to the channels.

In some examples, a method of preventing ice formation on a leading-edge portion of an airfoil may include directing hot air from a heat exchanger to an air delivery duct which extends along an interior of the leading-edge portion of the airfoil. The method may further include dispersing air from the air delivery duct toward channels formed between an inner skin and an outer skin of the leading-edge portion of the airfoil structure. Each channel may extend between an inlet and an outlet between upper and lower sections of the leading-edge portion. The method may further include venting air from the channels through the outlets.

Features, functions, and advantages may be achieved independently in various examples of the present disclosure, or may be combined in yet other examples, further details of which can be seen with reference to the following description and drawings.

DETAILED DESCRIPTION

Figure 1:
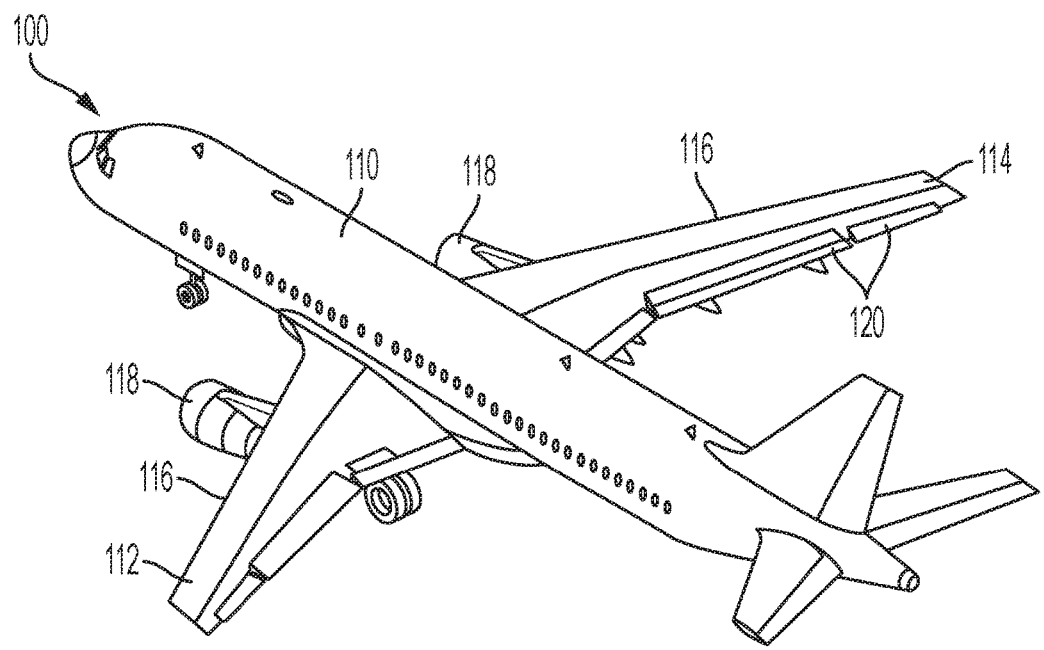
FIG. 1 is an isometric view of an illustrative aircraft.

Various aspects and examples of a thermal anti-ice system, as well as related methods, are described below and illustrated in the associated drawings. Unless otherwise specified, an anti-ice system in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through C, each of which is labeled accordingly.

Overview

In general, an anti-ice system in accordance with the present teachings includes an air delivery duct extending along a section of an airfoil such as an aircraft wing. The air delivery duct, which may also be referred to as a piccolo tube, may be supplied with hot air from a source such as a heat exchanger of a bleed air system, and/or an engine shaft driven compressor. The duct is mounted in a leading-edge portion of the airfoil, such as the nose of an aircraft wing. The duct may be mounted proximate an upper portion or upper surface of the leading-edge portion, and/or above a camber line of the airfoil. The duct may extend transverse to a direction of airflow over the airfoil, and may be enclosed by a removable cover.

The lead-edge portion of the airfoil includes an inner skin and an outer skin, which together form a plurality of channels. Each channel may extend from an air inlet proximate the upper surface of the leading-edge portion to an air outlet proximate a lower surface of the leading-edge portion. Each air inlet may be above the camber line and open to an interior of the airfoil, and each air outlet may be below the camber line and open to an exterior of the airfoil.

The air delivery duct includes a plurality of openings. Each opening is positioned to direct air from the duct to the air inlet of a respective channel. The anti-ice system may be thereby configured to direct heated air along the air delivery duct, through the plurality of openings, into the inlets of the plurality of channels, and out of the outlets of the plurality of channels. As the air passes through the channels, the outer skin of the leading-edge portion of the airfoil may be heated by the air, and thereby prevent formation of ice on the leading edge-portion of the airfoil.

The inner skin is contoured to form a desired channel geometry, which may tune properties of the flow of air through the channels. For example, the inner skin may be shaped to provide desired pressure and flow velocity through the channels. The channels may be uniform along the airfoil, and/or may vary in shape or dimension. Each channel may have a varying cross-sectional dimension, such as width and/or depth, between the respective air inlet and air outlet.

The inner skin may be configured to act as a structural member of the airfoil. For example, the inner skin may comprise a material of sufficient strength and/or rigidity such that the inner skin can replace a nose beam of an aircraft wing.

An anti-ice system in accordance with the present teachings may also be described as an anti-icing system or a de-icing system. The system may be configured to fully evaporate moisture on a selected surface, may be configured to limit ice formation to a selected size or extent, and/or may be configured for removal of accumulated ice. The anti-ice system may operate continuously, for instance to prevent ice formation, and/or may be operated selectively, for instance once ice formation reaches a predetermined level.

Examples, Components, and Alternatives

The following sections describe selected aspects of exemplary anti-ice systems as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative Anti-Ice System

As shown in FIGS. 5-8, this section describes an illustrative anti-ice system 300. System 300 is an example of an anti-ice system as described above.

FIG. 1 depicts an illustrative aircraft 100, which may include an anti-ice system. The aircraft is an example of aircraft 600 produced by illustrative method 500, as described below. Aircraft 100 includes a fuselage 110, a first wing 112, and a second wing 114. Second wing 114 extends from fuselage 110 on a side opposite first wing 112, and each wing includes a leading edge 116. In the depicted example, aircraft 100 includes two engines 118 which are each mounted below a wing. In some examples, the aircraft may include more or fewer engines, and the engines may be mounted elsewhere on the aircraft, such as on fuselage 110.

Both leading edge 116 and a trailing edge of each wing 112, 114 include flight control surfaces 120. The control surfaces may include, but are not limited to flaps, slats, ailerons, and/or spoilers. Actuators of flight control surfaces 120 may be housed in the interior of wings 112, 114. Anti-icing systems using heated air to prevent the formation of ice on the wings may also be housed in the interior of the wings. Such systems may be configured to prevent formation of ice by heating selected surfaces of wings 112, 114. For example, an anti-icing system may heat one or more fixed surfaces of a wing and/or may heat one or more flight control surfaces of a wing.

Figure 2:
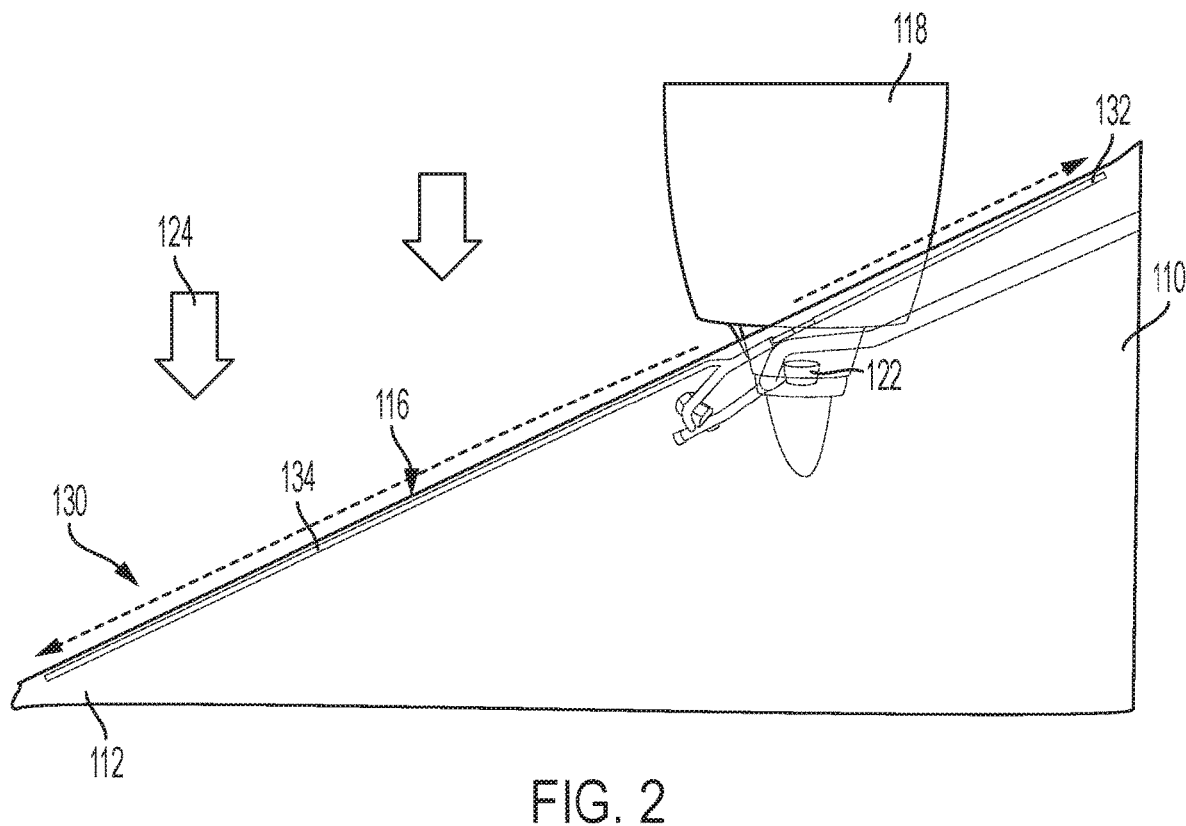
FIG. 2 is a schematic diagram of an air delivery system of the aircraft of FIG. 1

FIG. 2 depicts an illustrative air delivery apparatus 130 for a leading-edge anti-ice system. In the depicted example, air delivery apparatus 130 is mounted in first wing 112 of aircraft 100, and connected to a heat exchanger 122 of engine 118. The heat exchanger may be configured to provide heated air and may be connected to engine 118 in any effective manner. For example, the heat exchanger may provide bleed air from a bleed air system of engine 118 at a desired temperature and/or pressure. Typically, the heated air may have a temperature in a range between 200 and 250 degrees Fahrenheit. In some examples, the provided hot air may have a temperature in a range between 100 and 300 degrees Fahrenheit.

Connected to heat exchanger 122 are an inboard air delivery duct 132 and an outboard air delivery duct 134. Each duct may direct hot air from heat exchanger 122, along leading edge 116 of wing 112. Ducts 132, 134 may be described as extending parallel to leading edge 116, and/or as transverse to a wind direction 124. The wind direction may also be described as a direction of airflow over wing 112. Inboard air delivery duct 132 directs air from engine 118 toward fuselage 110. Outboard air delivery duct 134 directs air from engine 118 toward a tip of wing 112.

Each duct 132, 134 may supply hot air for ice-prevention at multiple locations along leading edge 116 of wing 112. The ducts may be configured to provide consistent air pressure along the length of leading edge 116. For example, a diameter of each duct may decrease with distance from heat exchanger 122.

In the present example, air delivery apparatus 130 includes both outboard and inboard air delivery ducts. In some examples, the apparatus may include either an outboard or an inboard air delivery duct. Ducts 132, 134 may together extend the full span of wing 112 or may extend along only a portion of the wing. Each duct may be unitary or may comprise a system of connected ducts, pipes, and/or other components.

Figure 3:
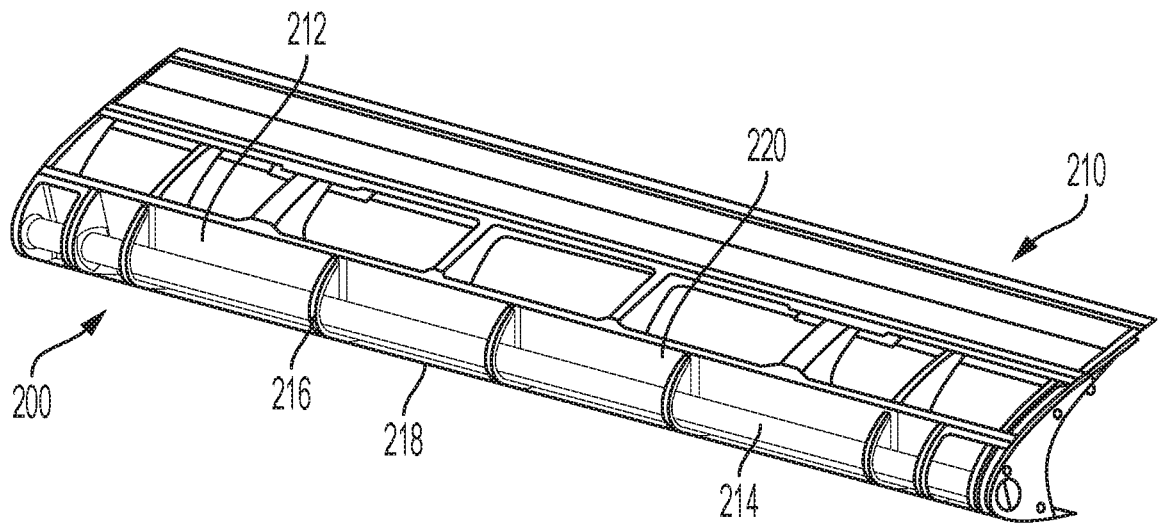
FIG. 3 is a partially transparent isometric view of a leading-edge anti-ice system.
Figure 4:
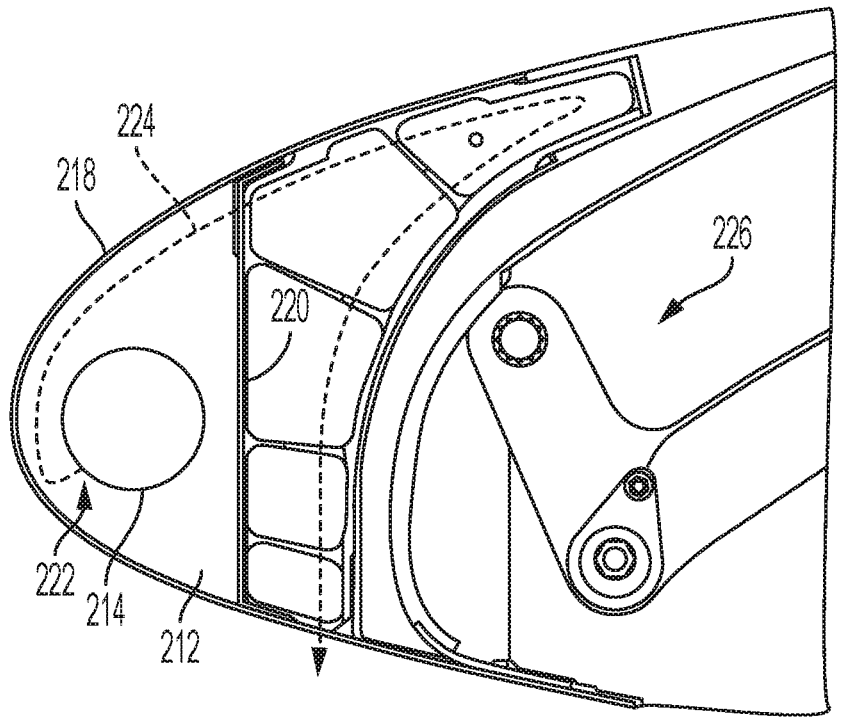
FIG. 4 is a cross-sectional view of the anti-ice system of FIG. 3.

FIGS. 3-4 depict a typical leading-edge anti-ice system 200, which may be installed in an aircraft such as aircraft 100 and supplied hot air by an apparatus such as air delivery apparatus 130. As shown in FIG. 3, the fixed leading-edge portion or nose 210 of an aircraft wing includes a forward cavity 212. An air delivery duct 214 extends through forward cavity 212, parallel to a leading edge 216 of the wing. Forward cavity 212 is defined between an outer skin 218 of nose 210, and a nose beam 220 of the wing.

As shown in FIG. 4, air delivery duct 214 includes multiple openings 222 from which hot air flows into forward cavity 212. Such a flow of air is depicted by dashed line 224. Each opening 222 of the duct is directed at one or more impingement points of outer skin 218. Openings at an upper edge of nose beam 220 and in the lower portion of outer skin 218, behind the nose beam, allow the hot air from forward cavity 212 to be vented outside of the wing. Heating of the aft cavity extends to the closeout boundary in front of the fixed leading-edge nose 210.

To achieve sufficient heating of outer skin 218, a large volume of hot air may need to be supplied to forward cavity 212 from air delivery duct 214. The air may tend to flow as indicated by arrow 224, but heating of the full outer skin 218 may necessitate a flow rate and pressure of hot air sufficient to fill the forward cavity. Temperature may also vary across the outer skin. For example, a peak temperature may be present adjacent each opening 222. For another example, cross flow may occur, with air moving through forward cavity 212 in a direction parallel to the air delivery duct.

Access to air delivery duct 214 for repairs or routine maintenance may be challenging and require removal of outer skin 218. Also shown in FIG. 4 is a flight control surface actuator 226. The position and size of actuator 226 may be limited by the position and extent of forward cavity 212.

Figure 5:
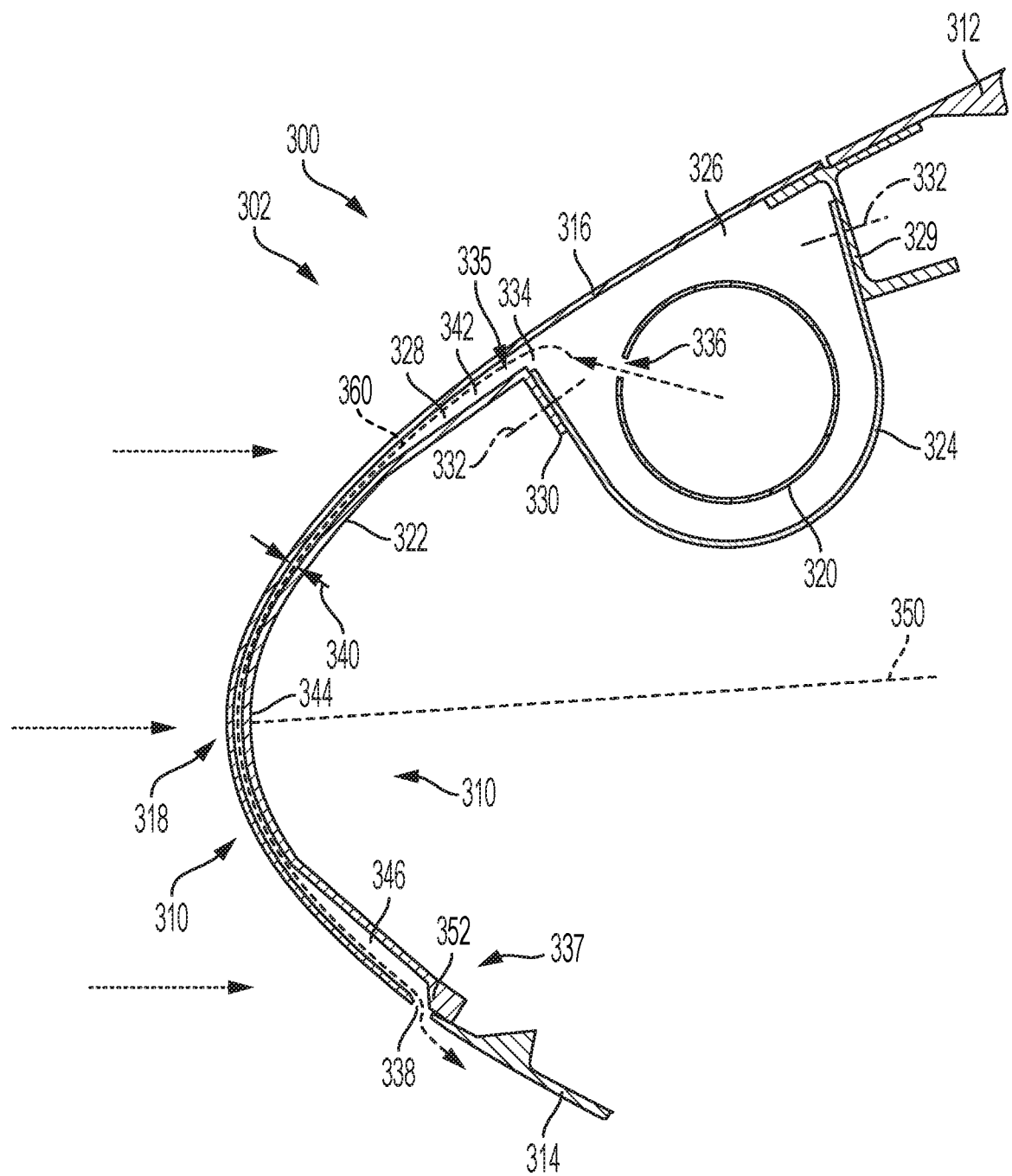
FIG. 5 is a schematic cross-sectional diagram of an illustrative leading-edge anti-ice system in accordance with aspects of the present disclosure.

FIG. 5 is a schematic diagram of illustrative anti-ice system 300, depicting a cross-section of a fixed leading-edge portion or nose 310 of an aircraft wing 302. Nose 310 is formed by an upper wing panel 312 and a lower wing panel 314. An aerodynamic outer skin 316 extends between the wing panels, defining a leading edge 318 of the wing. Wing panels 312, 314 may comprise a material or materials of any thermal properties, including but not limited to aluminum alloys and composite materials. Outer skin 316 may comprise a thermally conductive material such as a metal alloy, and may be configured to conduct heat from an inner surface to an outer surface.

In present example, anti-ice system 300 is configured to heat the fixed leading edge of an inboard portion of aircraft wing 302. In some examples, the anti-ice system may be configured to heat other fixed surfaces of the wing and/or control surfaces of inboard, outboard, leading and/or trailing portions of the wing and/or tail or canard surfaces. Anti-ice system may be positioned according to anti-ice needs of a specific aircraft. For example, the system may be used to heat a surface identified as most prone to ice formation in a simulation analysis.

Anti-ice system 300 includes an air delivery duct 320 and an inner skin 322. Air delivery duct 320 is enclosed between outer skin 316 and a cover 324, in a cavity 326. The air delivery duct may carry hot air from a source such as a heat exchanger or bleed air system, along wing nose 310. Air delivery duct 320 may be an example of air delivery apparatus 130. Duct 320 is mounted proximate, but spaced from, an upper portion of outer skin 316. The duct may be described as above leading edge 318 and/or as above a camber line 350 of wing 302.

Cover 324 may be described has having a flared c-shape and/or a parabolic shape. A first end of the cover is fastened to a stringer 329, the stringer being positioned at a join between outer skin 316 and upper wing panel 312. A second end of the cover is fastened to a flange 330 of inner skin 322. Both stringer 329 and flange 330 extend toward an interior of wing nose 310, approximately perpendicular to outer skin 316. Cover 324 is positioned such that the first end of the cover overlaps with stringer 329 and the second end of the cover overlaps flange 330. The first and second ends of the cover may also be described as having an outer surface in contact with a substantial portion of the stringer and flange.

Cover 324 is removably connected to the stringer and the flange by fastener assemblies 332. In the depicted example, each of the first and second ends of cover 324 includes a fixed nut element. A bolt extends through an aperture in each of stringer 329 and flange 330 to threadingly engage the fixed nut elements. Together the fixed nut elements and bolts form fastener assemblies 332.

Any effective number and/or combination of fasteners or fastener assemblies may be used to connect cover 324. The cover may be removably and/or permanently fixed in position and may be connected and/or mounted to any suitable structures or components of wing nose 310. Cover 324 may be shaped to define a desired geometry and/or volume of cavity 326. The cover may be positioned and/or shaped according to the location of air delivery duct 320 and/or nearby structural components.

Air delivery duct 320 may vary in size along wing nose 310. For example, the duct may decrease in diameter toward a fuselage or wingtip in order to maintain a consistent air pressure throughout the duct. Cover 324 may similarly vary in size, such that the volume of cavity 326 remains constant along wing nose 310. In the depicted example, air delivery duct 320 has a diameter of approximately 2¾ inches. Duct 320 and cover 324 may be any size appropriate to desired airflow properties such as velocity, pressure, and/or volume.

Cover 324 may comprise a flexible, resilient material in order to allow deformation during installation or removal of the cover. An installer or maintenance worker may compress the first end of the cover toward the second end of the cover, such that the two ends can be inserted between stringer 329 and flange 330. The cover may be similarly compressed to allow the ends of the cover to be withdrawn from between the stringer and the flange. When released from such compression, the resilient material of cover 324 may bias the cover to return to a flared c-shape.

When cover 324 is appropriately positioned between stringer 329 and flange 330, the material of the cover may bias the ends of the cover against the stringer and the flange. That is, the ends of the cover may be urged into contact with the stringer and the flange. Cover 324 may thereby form an airtight seal with stringer 329 and flange 330. In some examples, a seal may be provided between the ends of the cover and the stringer and flange to ensure that the seal is sufficiently airtight.

Figure 6:
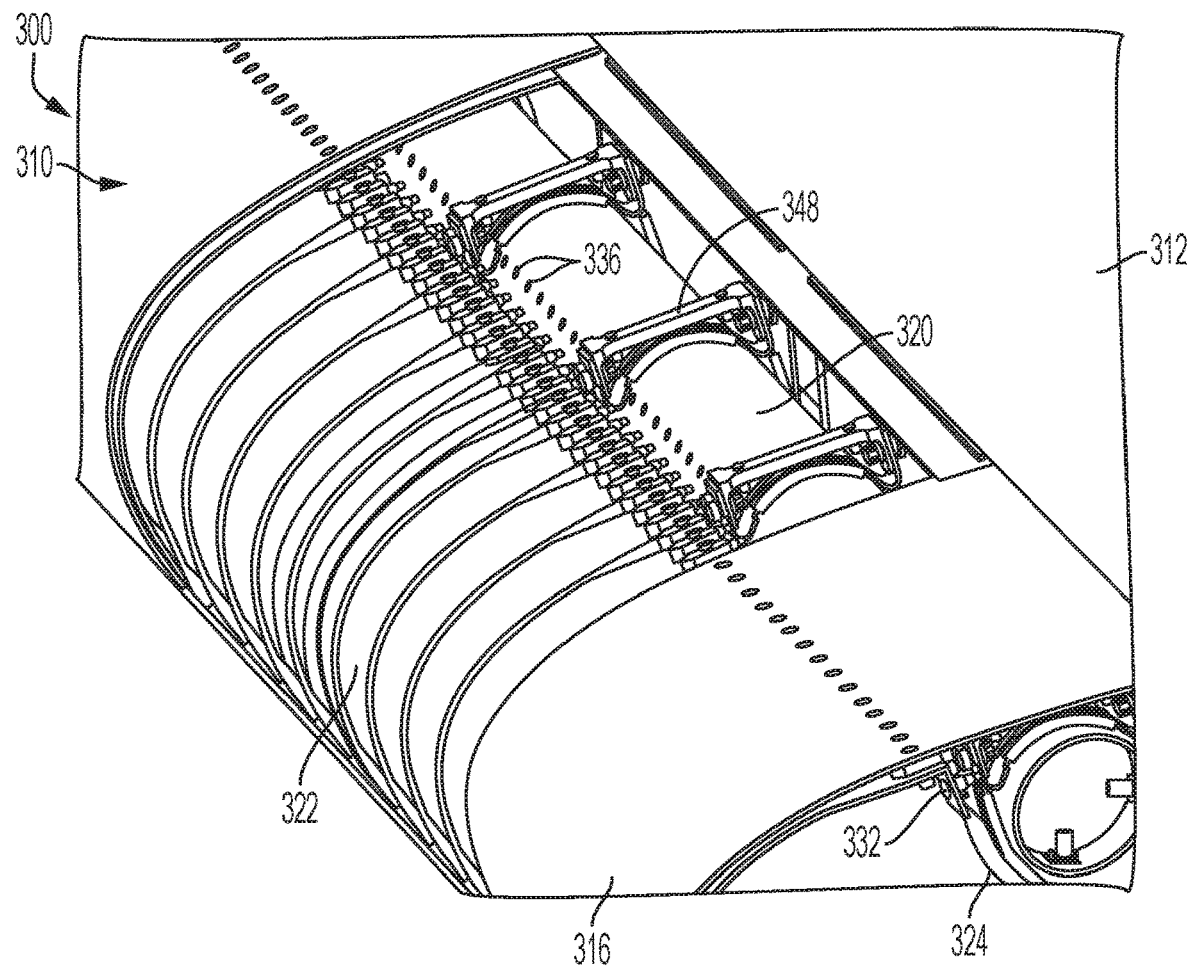
FIG. 6 is an isometric view of the anti-ice system of FIG. 5.

As shown in FIG. 6, air delivery duct 320 is supported by a series of braces 348. The braces may be fixed and/or fastened to any appropriate structure, including outer skin 316, inner skin 322, and/or stringer 329.

Referring again to FIG. 5, inner skin 322 is positioned adjacent outer skin 316, to form a plurality of channels 328. Each channel includes an inlet 334 in fluid communication with cavity 326. Air delivery duct 320 includes a plurality of openings 336, each opening corresponding to an inlet 334. Each opening 336 is positioned on duct 320 such that air flowing through the opening is directed toward the corresponding inlet 334. In other words, duct 320 is configured to vent hot air from openings 336 toward inlets 334. Directing openings 336 toward inlets 334 may improve uniformity of the heating of outer skin 316, and reduce peak temperatures on the outer skin proximate the openings.

Each channel 328 extends from inlet 334 to an outlet 338 which is in fluid communication with the exterior of wing 302. Each inlet 334 may be described as a gap between outer skin 316 and an upper end 335 of inner skin 322, which opens onto cavity 326. Inlets 334 may be described as above leading edge 318, as proximate an upper portion of outer skin 316, and/or as above camber line 350. Each outlet 338 may be described as a gap between outer skin 316 and lower wing panel 314, which is open to the outside of wing 302. Outlets 338 may be described as below leading edge 318, proximate a lower portion of outer skin 316, and/or as below camber line 350.

Anti-ice system 300 is configured to channel hot air from air delivery duct 320 as indicated by dashed arrow 360. The air may flow from openings 336 through cavity 326 and into inlets 334. Some of the hot air may also fill cavity 326. As the air of airflow 360 passes from inlets 334 down channels 328, heat may be transferred from the air to outer skin 316. Outer skin 316 and inner skin 322 may be referred to as a heat exchange. The air may then exit outlets 338 and continue under wing 302. Due to the positions of duct 320, inlets 334, and outlets 338, the air may travel downward over leading edge 318. Outer skin 316 and inner skin 322 may therefore be referred to as a reverse flow heat exchange.

Channels 328 are defined between an inner surface of outer skin 316 and an outer surface 323 of inner skin 322. The geometry of channels 328 is determined by an outer contour of inner skin 322. In other words, the curvature and features of inner skin 322 which face outer skin 316 determine properties of channels 328 such as cross-sectional area and cross-sectional shape. Inner skin 322 may be contoured relative to outer skin 316 such that channels 328 are tuned to achieve desired airflow characteristics such as pressure and flow velocity through the channels.

A depth 340 of each channel may be defined as a distance between the outer skin and the inner skin. Depth 340 may vary along each channel 328. Each channel 328 may be described as having an upper portion 342 proximate inlet 334, a middle portion 344 proximate leading edge 318, and a lower portion 346 proximate outlet 338. In the present example, depth 340 has a first value for upper portion 342 and lower portion 346 and a second value for middle portion 344, the first value being greater than the second value. For instance, upper portion 342 and lower portion 346 may each have a depth of 0.2 inches, while middle portion 344 has a depth of 0.1 inches. In some examples, depth 340 may differ between upper portion 342 and lower portion 346. In some examples, depth 340 may be constant throughout channels 328 and/or may vary as appropriate to achieve desired airflow characteristics through the channels. Depth 340 may be within a range of approximately one hundredth of an inch and one inch.

Increased depth of channels 328 proximate inlets 334 and outlets 338 may increase flow velocity at the inlets and outlets, thereby facilitating consistent flow with a higher overall velocity through the channels. Consistent flow may improve temperature uniformity and reduce hot spots on outer skin 316. The inlets and outlets may also be configured to avoid choking or restricting the flow of air through the channels. For example, the gap between outer skin 316 and lower wing panel 314 which forms each outlet 338 may be sized to avoid restriction of airflow.

For another example, as shown in FIG. 5, inner skin includes a chamfer 352 adjacent to outlets 338. The chamfer may form an angle of approximately one hundred and thirty-five degrees with the adjacent surface of inner skin 322, or any angle greater than approximately ninety degrees. Chamfer 352 as depicted may also be described as a forty-five degree chamfer. The chamfer may reduce restriction of flow through outlets 338, and improve flow velocity.

Increased depth of channels 328 proximate inlets 334 and outlets 338 may reduce airflow pressure through channels 328. The inlets, air delivery duct 320, and cavity 326 may also be configured to reduce air pressure in anti-ice system 300. For example, air delivery duct 320 and openings 336 may have diameters selected to reduce the pressure required to deliver a desired airflow mass. For another example, the volume of cavity 326 and location of openings 336 on air delivery duct 320 may be selected to reduce the air pressure needed to achieve a desired flow velocity in channels 328. For another example, the gap between inner skin 322 and outer skin 316 which forms each inlet 334 may be sized to reduce the pressure in the channels at a desired flow rate.

Reduced pressure use by anti-ice system 300 may free up a limited supply of heated bleed air from an aircraft engine for use by other systems. For example, another anti-ice system according to the present disclosure may be installed on the outboard leading edge of wing 302 and use the available bleed air. Reduced pressure in channels 328 may also improve loading in wing 302 resulting from the airflow, and reduce weight driven into the wing.

Figure 7:
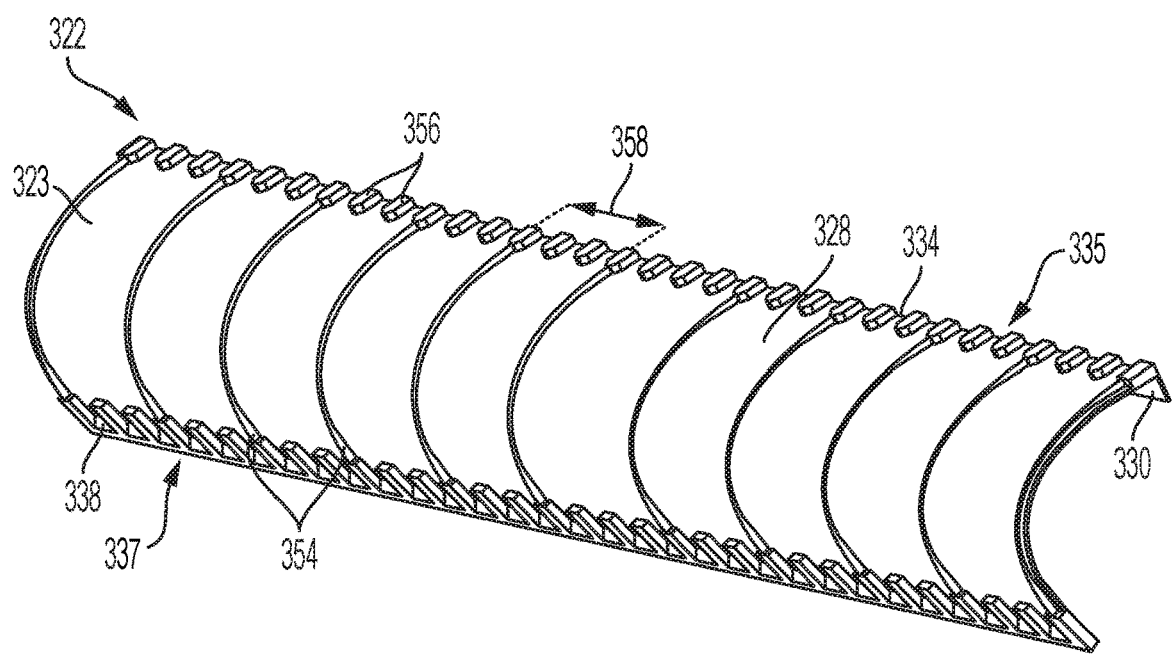
FIG. 7 is an isometric view of the inner skin of the anti-ice system of FIG. 5.

FIG. 7 is a view of outer surface 323 of inner skin 322. The skin includes a plurality of ridges 354 and a plurality of bosses 356. Each ridge 354 runs from upper end 335 of inner skin 322 to a lower end 337 of the skin and is configured to contact the outer skin. Ridges 354 may be described as sealing against the outer skin and/or as forming an airtight seal with the outer skin. Each channel is thereby defined between two adjacent ridges 354. A distance between adjacent ridges 354 may be referred to as a channel width 358. In the depicted example, the channels have a constant width. In some examples, channel width 358 may vary from upper end 335 to lower end 337 of inner skin 322 and/or may vary between channels.

Dividing the space between inner skin 322 and the outer skin of the wing nose into distinct channels with ridges 354 may improve consistency of the heating of the outer skin by limiting crossflow along the leading edge. Channel width 358 may be selected, in combination with other properties of channels 328, to reduce pressure through the channels and increase temperature and/or heating uniformity across the wing nose.

Bosses 356 facilitate connection of inner skin 322 to the outer skin while spacing the inner skin from the outer skin. Each boss is configured to contact outer skin 316 and may include features appropriate to a selected fastener or connection type. For example, each boss 356 may include a threaded aperture sized to receive a bolt and corresponding to an aperture in the outer skin. In FIG. 6, bosses 356 are shown including a fastener. For another example, each boss 356 may have an outer surface appropriate for bonding to the outer skin.

Each boss 356 has a thickness corresponding to the depth of adjacent channel 328 for the location of the boss along the channel. The bosses may be positioned at any point on the outer surface of inner skin 322, in any pattern appropriate to connection of the inner skin to the outer skin. In the present example, bosses 356 are arranged in two rows, at upper end 335 and lower end 337 of inner skin 322. Bosses 356 along the upper end of inner skin 322 have a thickness corresponding to inlets 334, and the bosses along the lower end of the inner skin have a thickness corresponding to outlets 338.

In the present example, inner skin 322 is also configured to act as a structural member of the wing. The inner skin may be described as a nose beam, or as replacing a nose beam of the wing. Inner skin 322 may comprise a heat-tolerant material with structural properties appropriate to a structural member. For example, the inner skin may be machined of an aluminum alloy. In some examples, replacing a nose beam with inner skin 322 may provide additional space in the interior of the wing nose. In some examples, structural properties of inner skin 322 may allow the outer skin of the wing nose to be thinner and/or lighter.

Figure 8:
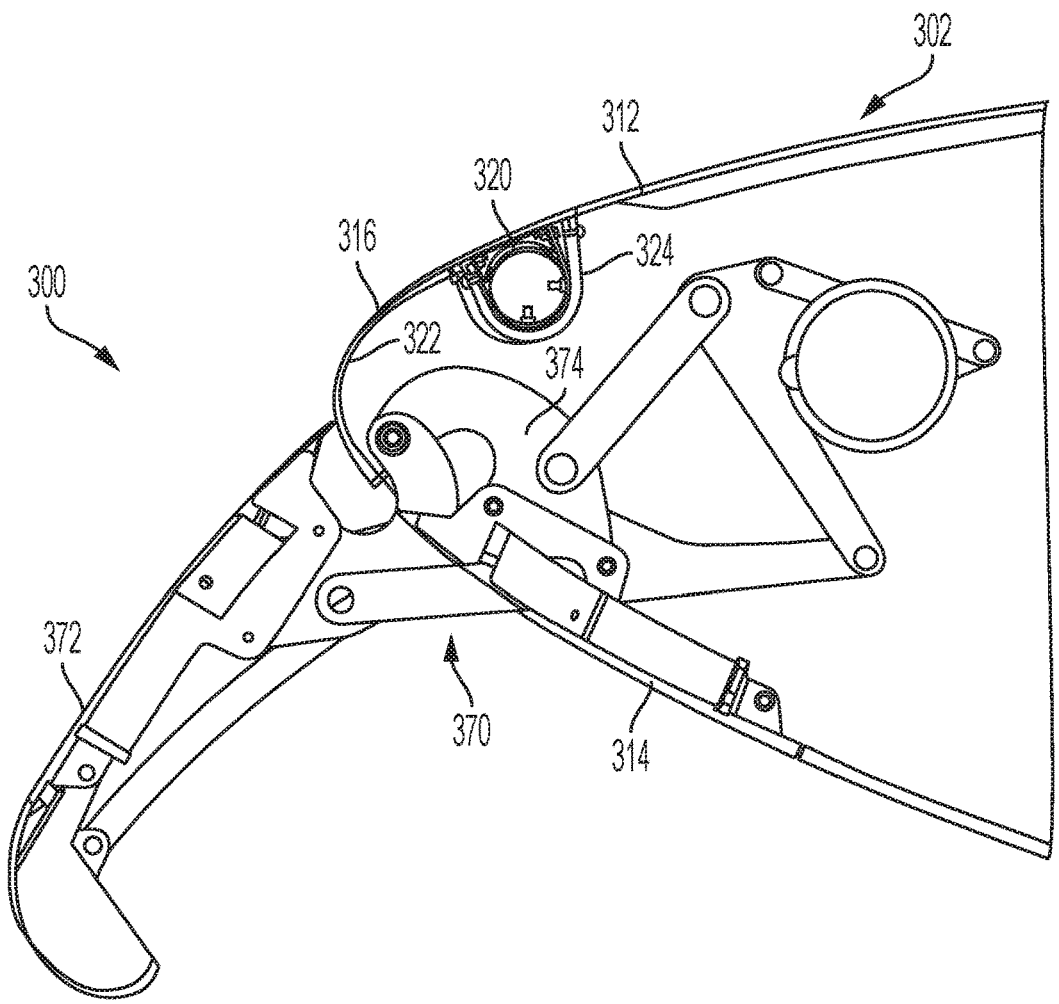
FIG. 8 is a cross-sectional view of a wing leading edge, including the anti-ice system of FIG. 5 and an extended Krueger flap.

FIG. 8 is a cross-sectional view of wing 302, including anti-ice system 300 and a high lift system 370. In the present example, the system controls Krueger flaps 372. The high lift system includes actuators, electrical systems, and a Krueger hinge 374. Air delivery duct 320 is positioned above the camber line of the wing, at the upper surface of the wing nose. Inner skin 322 conforms closely to outer skin 316, while acting as the nose beam of the wing. Krueger hinge 374 can therefore be positioned in the nose of the wing. Such positioning may allow a reduced size of hinge 374 and/or actuators for the hinge, and may improve a trajectory of Krueger flaps 372. Such positioning may also free up space for other systems in wing 302.

B. Illustrative Method of Preventing Ice Formation

Figure 9:
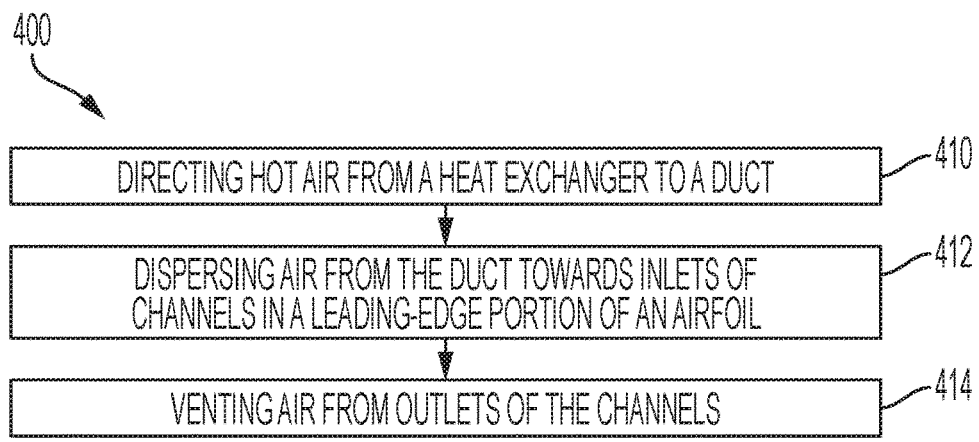
FIG. 9 is a flow chart depicting steps of an illustrative method for preventing ice formation on a leading edge of an airfoil, according to the present teachings.

This section describes steps of an illustrative method 400 for preventing formation of ice on a leading edge of an airfoil; see FIG. 9. Aspects of aircraft and/or anti-ice systems described above may be utilized in the method steps described below. Where appropriate, reference may be made to components and systems that may be used in carrying out each step. These references are for illustration and are not intended to limit the possible ways of carrying out any particular step of the method.

FIG. 9 is a flowchart illustrating steps performed in an illustrative method, and may not recite the complete process or all steps of the method. Although various steps of method 400 are described below and depicted in FIG. 9, the steps need not necessarily all be performed, and in some cases may be performed simultaneously or in a different order than the order shown.

At step 410, the method includes directing hot air from a heat exchanger to a duct. For example, the heat exchanger may be part of a bleed air system of an aircraft engine, and the duct may be a piccolo tube connected to the heat exchanger. The duct may extend along a portion of an airfoil, such as an aircraft wing. For example, the duct may extend parallel to a leading edge of a wing, between a wing-mounted engine and a fuselage of an aircraft. The duct may be mounted inside the airfoil, above a camber line of the airfoil. For example, the duct may be supported by brackets from an upper portion of an outer aerodynamic skin of the airfoil.

Step 412 of the method includes dispersing air from the duct towards inlets of channels in a leading-edge portion of an airfoil. The duct may include a plurality of openings along the length of the duct, configured to disperse hot air. Each opening may be positioned on the duct such that dispersed air is directed toward an inlet of a channel. The duct may be enclosed by a cover, and dispersing air from the duct may include filling an enclosed volume with hot air.

The leading-edge portion of the airfoil may include an inner skin and an outer skin, the channels being defined between the inner and outer skins by a plurality of ridges on the inner skin. The inner skin may be fixed to the outer skin, and may act as a structural member of the airfoil. A distance between the inner and outer skin may define a depth of the channels, which may vary along the channels.

Step 414 of the method includes venting air from outlets of the channels. Each channel may include an inlet at a first end and an outlet at a second end. Venting air may include conveying air dispersed from the duct in step 412 along the channels from the inlets to the outlets. Each inlet may be disposed above a leading edge of the airfoil and each outlet may be disposed below the leading edge. Conveying air along the channels may include directing the air in a reverse flow direction, downward along an inner surface of the leading edge of an outer skin of the airfoil. Conveying air along the channels may also include transferring heat from the air to the outer skin, thereby uniformly heating the outer skin.

Each channel may have a varying cross-sectional dimension between the inlet and the outlet. For example, the channel may have a greater depth in an upper portion proximate the inlet and in a lower portion proximate the outlet than in a middle portion proximate the leading edge of the airfoil. Such varying dimension may allow air to be conveyed through the channels with consistent flow, high flow velocity, and low pressure.

C. Illustrative Aircraft and Associated Method

Figure 10:
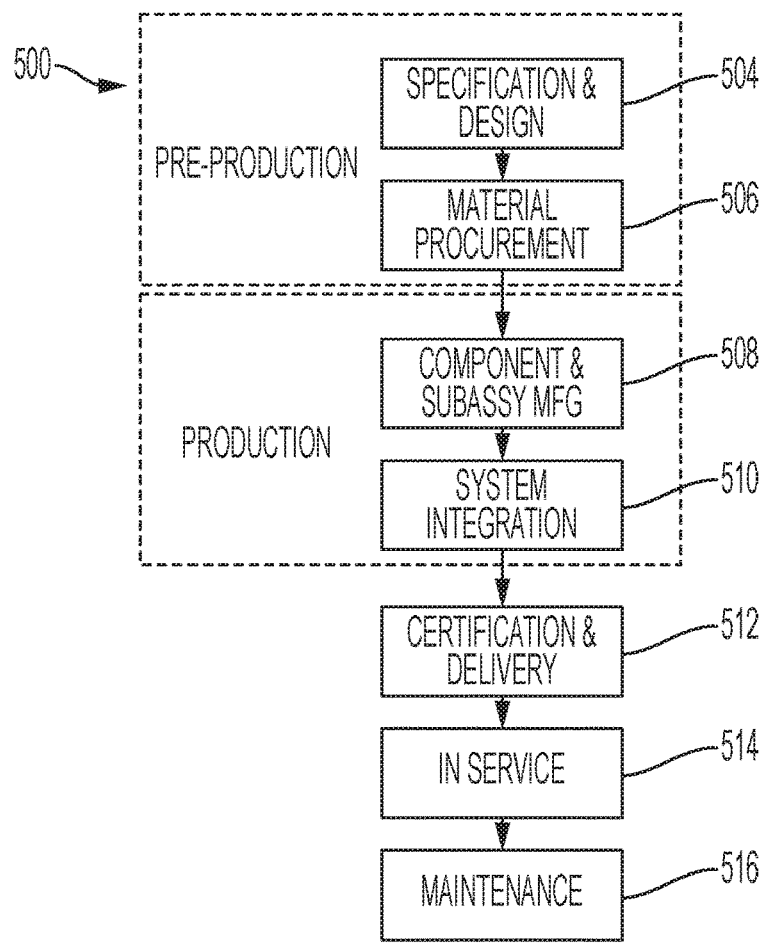
FIG. 10 is a flowchart depicting steps of an illustrative aircraft manufacturing and service method.
Figure 11:
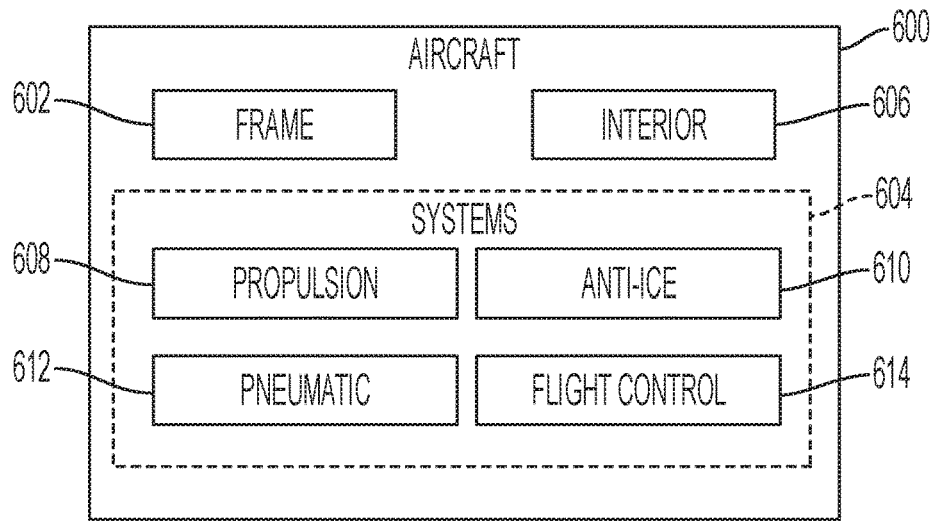
FIG. 11 is a schematic diagram of an illustrative aircraft.

Examples disclosed herein may be described in the context of an illustrative aircraft manufacturing and service method 500 (see FIG. 10) and an illustrative aircraft 600 (see FIG. 11). Method 500 includes a plurality of processes, stages, or phases. During pre-production, method 500 may include a specification and design phase 504 of aircraft 600 and a material procurement phase 506. During production, a component and subassembly manufacturing phase 508 and a system integration phase 510 of aircraft 600 may take place. Thereafter, aircraft 600 may go through a certification and delivery phase 512 to be placed into in-service phase 514. While in service (e.g., by an operator), aircraft 600 may be scheduled for routine maintenance and service 516 (which may also include modification, reconfiguration, refurbishment, and so on of one or more systems of aircraft 600). While the examples described herein relate generally to operational use during in-service phase 514 of aircraft 600, they may be practiced at other stages of method 500.

Each of the processes of method 500 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 11, aircraft 600 produced by illustrative method 500 may include a frame 602 with a plurality of systems 604 and an interior 606. Examples of plurality of systems 604 include one or more of a propulsion system 608, an anti-ice system 610, a pneumatic system 612, and a flight control system 614. Each system may comprise various subsystems, such as controllers, processors, actuators, effectors, motors, generators, etc., depending on the functionality involved. Any number of other systems may be included. Although an aerospace example is shown, the principles disclosed herein may be applied to other industries, such as the automotive industry, rail transport industry, and nautical engineering industry. Accordingly, in addition to aircraft 600, the principles disclosed herein may apply to other vehicles, e.g., land vehicles, marine vehicles, etc.

Apparatuses and methods shown or described herein may be employed during any one or more of the stages of the manufacturing and service method 500. For example, components or subassemblies corresponding to component and subassembly manufacturing phase 508 may be fabricated or manufactured in a manner similar to components or subassemblies produced while aircraft 600 is operating during in-service phase 514. Also, one or more examples of the apparatuses, methods, or combinations thereof may be utilized during manufacturing phase 508 and system integration phase 510, for example, by substantially expediting assembly of or reducing the cost of aircraft 600. Similarly, one or more examples of the apparatus or method realizations, or a combination thereof, may be utilized, for example and without limitation, while aircraft 600 is in in-service phase 514 and/or during maintenance and service phase 516.

Illustrative Combinations and Additional Examples

This section describes additional aspects and features of anti-ice systems and related methods, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A0. An anti-ice system, comprising:
an airfoil structure including a leading-edge portion facing a wind direction, and including an outer skin and an inner skin forming a plurality of channels, each channel having an air inlet and an air outlet,
an air delivery duct inside the airfoil structure extending substantially transverse to the wind direction, the air delivery duct having a plurality of openings directed toward the air inlets of the plurality of channels, and
an air supply configured to provide hot air to the air delivery duct.

A1. The anti-ice system of A0, wherein each channel has a cross-sectional dimension and each cross-sectional dimension varies between the air inlet and the air outlet.

A2. The anti-ice system of A1, wherein each channel has an upper portion, a middle portion, and a lower portion, at least one of the upper and lower portions having an increased cross-sectional area as compared to the middle portion.

A3. The anti-ice system of A1 or A2, wherein each channel has an upper portion, a middle portion, and a lower portion, the upper and lower portions each having an increased cross-sectional area as compared to the middle portion.

A4. The anti-ice system of any of A0-A3, wherein the air inlets receive air from inside the airfoil structure, and the air outlets discharge air outside of the airfoil structure.

A5. The anti-ice system of any of A0-A4, wherein the inner skin has a front surface facing the outer skin, including an upper edge portion, a lower edge portion, and multiple ridges extending from the upper edge portion to the lower edge portion, the multiple ridges forming walls for the plurality of channels.

A6. The anti-ice system of A5, wherein the front surface has a plurality of protrusions along the upper and lower edge portions configured to connect the inner and outer skins.

A7. The anti-ice system of any of A0-A6, further comprising:
a cover to enclose the air delivery duct.

A8. The anti-ice system of A7, wherein the cover is connected to flange structures inside the airfoil structure.

A9. The anti-ice system of A8, wherein the inner skin has a front surface facing the outer skin, and including an upper edge portion, the flange structures including a first flange structure inwardly extending substantially orthogonally from the upper edge portion of the inner skin.

A10. The anti-ice system of A8 or A9, wherein the cover is removably fastened to the flange structures.

A11. The anti-ice system of any of A7-A10, wherein the cover has a flared C-shape.

A12. The anti-ice system of any of A0-A11, wherein the heat exchanger is in fluid communication with the air delivery duct.

A13. The anti-ice system of any of A0-A12, wherein the airfoil structure includes an upper surface and a lower surface, each air inlet being adjacent the upper surface and each air outlet being adjacent the lower surface.

A14. The anti-ice system of any of A0-A13, wherein the airfoil structure includes a camber line, each air inlet being above the camber line and each air outlet being below the camber line.

A15. The anti-ice system of any of A0-A14, wherein the air delivery duct is disposed above a camber line of the airfoil structure.

A16. The anti-ice system of any of A0-A15, wherein the air delivery duct is disposed proximate an upper surface of the airfoil structure.

A17. The anti-ice system of any of A0-A15, wherein the air supply includes a heat exchanger.

B0. An aircraft, comprising:
a fuselage,
a first wing extending from the fuselage, a second wing extending from an opposing side of the fuselage, each wing including a leading-edge portion facing a wind direction, each leading-edge portion including an outer skin and an inner skin forming a plurality of internal channels, each internal channel having an internal air inlet and an external air outlet,
each wing including an air delivery duct extending substantially transverse to the wind direction, each air delivery duct having a plurality of openings directed toward the internal air inlets of the respective plurality of internal channels, and
an air supply configured to provide hot air to the plurality of internal channels.

B1. The aircraft of B0, wherein each internal channel has a cross-sectional dimension and each cross-sectional dimension varies between the air inlet and air outlet.

B2. The aircraft of B0 or B1, wherein each internal channel has an upper portion, a middle portion, and a lower portion, at least one of the upper and lower portions having an increased cross-sectional area as compared to the middle portion.

B3. The aircraft of any of B0-B2, wherein each channel has an upper portion, a middle portion, and a lower portion, the upper and lower portions each having an increased cross-sectional area compared to the middle portion.

B4. The aircraft of any of B0-B3, wherein the inner skin has a front surface facing the outer skin, including an upper edge portion, a lower edge portion, and multiple ridges extending from the upper edge portion to the lower edge portion, the multiple ridges forming walls for the plurality of internal channels.

B5. The aircraft of B4, wherein the front surface has a plurality of protrusions along the upper and lower edge portions configured to connect the inner and outer skins.

B6. The aircraft of any of B0-B5, further comprising:
a cover to enclose the air delivery duct in each wing, each cover being connected to flange structures inside the respective wing, wherein one of the flange structures extends substantially orthogonally from an upper edge portion of the inner skin.

B7. The aircraft of any of B0-B6, wherein the air supply includes a heat exchanger of a bleed air system.

B8. The aircraft of any of B0-B7, wherein the air supply includes an engine shaft driven compressor.

C0. A method of preventing ice formation on a leading-edge portion of an airfoil, comprising:

directing hot air from a heat exchanger to an air delivery duct extending along an interior of a leading-edge portion of an airfoil structure, dispersing air from the air delivery duct toward channels formed between an inner skin and an outer skin of the leading-edge portion of the airfoil structure, wherein each channel extends between an inlet and an outlet between upper and lower sections of the leading-edge portion, and venting air from the channels through the outlets.

C1. The method of C0, wherein each channel has a varying cross-sectional dimension between the inlet and the outlet.

C2. The method of C0 or C1, wherein venting air from the channels includes venting air outside of the airfoil.

C3. The method of any of C0-C2, wherein the inlet of each channel is at a first end of the channel and the outlet of each channel is at a second end of the channel.

Advantages, Features, and Benefits

The different examples of the anti-ice system described herein provide several advantages over known solutions for preventing formation of ice on a leading edge of an airfoil. For example, illustrative examples described herein allow greater space and clearance inside the airfoil for other systems such as flight control surface actuators.

Additionally, and among other benefits, illustrative examples described herein allow an inner skin of the anti-ice system to act as a structural member of the airfoil.

Additionally, and among other benefits, illustrative examples described herein reduce the volume of hot air required for effective prevention of ice formation.

Additionally, and among other benefits, illustrative examples described herein reduce air pressure and weight driven into the airfoil.

Additionally, and among other benefits, illustrative examples described herein provide a consistent flow of hot air over the aerodynamic outer skin of the airfoil.

Additionally, and among other benefits, illustrative examples described herein allow maintenance access to air delivery ducts.

No known system or device can perform these functions, particularly while achieving effective uniform heating of the aerodynamic outer skin of the airfoil. Thus, the illustrative examples described herein are particularly useful for preventing ice formation on aircraft wings. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An anti-ice system, comprising:
an airfoil structure having a camber line, including a leading-edge portion facing a wind direction, and including an outer skin and an inner skin forming a plurality of channels, each channel having an air inlet above the camber line and an air outlet below the camber line,
an air delivery duct inside the airfoil structure extending substantially transverse to the wind direction, the air delivery duct being above the camber line and having a plurality of openings directed toward the air inlets of the plurality of channels, and
an air supply configured to provide hot air to the air delivery duct.

2. The anti-ice system of claim 1, wherein each channel has a cross-sectional dimension and each cross-sectional dimension varies between the air inlet and the air outlet.

3. The anti-ice system of claim 2, wherein each channel has an upper portion, a middle portion, and a lower portion, at least one of the upper and lower portions having an increased cross-sectional area as compared to the middle portion.

4. The anti-ice system of claim 2, wherein each channel has an upper portion, a middle portion, and a lower portion, the upper and lower portions each having an increased cross-sectional area as compared to the middle portion.

5. The anti-ice system of claim 1, wherein the air inlets receive air from inside the airfoil structure, and the air outlets discharge air outside of the airfoil structure.

6. The anti-ice system of claim 1, wherein the inner skin has a front surface facing the outer skin, including an upper edge portion, a lower edge portion, and multiple ridges extending from the upper edge portion to the lower edge portion, the multiple ridges forming walls for the plurality of channels.

7. The anti-ice system of claim 6, wherein the front surface has a plurality of protrusions along the upper and lower edge portions configured to connect the inner and outer skins.

8. The anti-ice system of claim 1, further comprising:
a cover to enclose the air delivery duct.

9. The anti-ice system of claim 8, wherein the cover is connected to flange structures inside the airfoil structure.

10. The anti-ice system of claim 9, wherein the inner skin has a front surface facing the outer skin, and including an upper edge portion, the flange structures including a first flange structure inwardly extending substantially orthogonally from the upper edge portion of the inner skin.

11. The anti-ice system of claim 8, wherein the cover has a flared C-shape.

12. An aircraft, comprising:
a fuselage,
a first wing extending from the fuselage, a second wing extending from an opposing side of the fuselage, each wing including a leading-edge portion facing a wind direction, each leading-edge portion including an outer skin and an inner skin forming a plurality of internal channels, each internal channel having an internal air inlet and an external air outlet, each wing including an air delivery duct extending substantially transverse to the wind direction, each air delivery duct having a plurality of openings directed toward the internal air inlets of the respective plurality of internal channels, and an air supply configured to provide hot air to the plurality of internal channels, wherein each internal channel has a middle portion extending between the air inlet and the air outlet, the air inlet and the air outlet each having a greater cross-sectional area than the middle portion.

13. The aircraft of claim 12, wherein the air supply includes a heat exchanger of a bleed air system.

14. The aircraft of claim 12, wherein the inner skin has a front surface facing the outer skin, including an upper edge portion, a lower edge portion, and multiple ridges extending from the upper edge portion to the lower edge portion, the multiple ridges forming walls for the plurality of internal channels.

15. The aircraft of claim 14, wherein the front surface has a plurality of protrusions along the upper and lower edge portions configured to connect the inner and outer skins.

16. The aircraft of claim 12, further comprising:

a cover to enclose the air delivery duct in each wing, each cover being connected to flange structures inside the respective wing, wherein one of the flange structures extends substantially orthogonally from an upper edge portion of the inner skin.

17. The aircraft of claim 12, wherein each wing has a camber line, the air delivery duct and the internal air inlet of each internal channel being above the camber line and the external air outlet of each internal channel being below the camber line.

18. A method of preventing ice formation on a leading-edge portion of an airfoil, comprising:

directing hot air to an air delivery duct extending along an interior of a leading-edge portion of an airfoil structure, enclosing the air delivery duct with a cover, dispersing air from the air delivery duct into an airtight cavity enclosed by the cover toward channels formed between an inner skin and an outer skin of the leading-edge portion of the airfoil structure, wherein each channel extends between an inlet and an outlet and each inlet is in fluid communication with the airtight cavity, and venting air from the channels through the outlets.

19. The method of claim 18, wherein each channel has a varying cross-sectional dimension between the inlet and the outlet.

20. The method of claim 18, wherein the airfoil has a camber line, the air delivery duct and the inlet of each channel being above the camber line and the outlet of each channel being below the camber line.

* * * * *